United States Patent
Dawson et al.

(10) Patent No.: US 10,348,050 B2
(45) Date of Patent: Jul. 9, 2019

(54) ND³⁺ FIBER LASER AND AMPLIFIER

(71) Applicant: Lawrence Livermore National Security, LLC, Livermore, CA (US)

(72) Inventors: Jay W Dawson, Livermore, CA (US); Graham S Allen, Livermore, CA (US); Derrek Reginald Drachenberg, Livermore, CA (US); Victor V Khitrov, San Ramon, CA (US); Michael J Messerly, Danville, CA (US); Paul H Pax, Livermore, CA (US); Nick Schenkel, Livermore, CA (US)

(73) Assignee: Lawrence Livermore National Security, LLC, Livemore, CA (US)

( * ) Notice: Subject to any disclaimer, the term of this patent is extended or adjusted under 35 U.S.C. 154(b) by 0 days.

(21) Appl. No.: 15/288,810

(22) Filed: Oct. 7, 2016

(65) Prior Publication Data

US 2017/0229838 A1 Aug. 10, 2017

Related U.S. Application Data

(60) Provisional application No. 62/291,483, filed on Feb. 4, 2016.

(51) Int. Cl.
*G02B 6/02* (2006.01)
*G02B 6/14* (2006.01)
(Continued)

(52) U.S. Cl.
CPC ........ *H01S 3/06741* (2013.01); *G02B 6/0238* (2013.01); *G02B 6/02338* (2013.01);
(Continued)

(58) Field of Classification Search
CPC .. H01S 3/06754; H01S 3/067; H01S 3/06741; H01S 3/06716; H01S 3/06733;
(Continued)

(56) References Cited

U.S. PATENT DOCUMENTS 4,782,491 A * 11/1988 Snitzer .................... H01S 3/067
372/39
4,986,629 A    1/1991 Auge et al.
(Continued)

OTHER PUBLICATIONS

George Geddes "Amplified Spontaneous Emission in Neodymium-Doped Fiber Lasers" Oct. 26, 2011 pp. 1-29.*
(Continued)

*Primary Examiner* — Jessica S Manno
*Assistant Examiner* — Delma R. Fordé
(74) *Attorney, Agent, or Firm* — John P. Wooldridge

(57) ABSTRACT

An Nd³⁺ optical fiber laser and amplifier operating in the wavelength range from 1300 to 1450 nm is described. The fiber includes a rare earth doped optical amplifier or laser operating within this wavelength band is based upon an optical fiber that guides light in this wavelength band. The waveguide structure attenuates light in the wavelength range from 850 nm to 950 nm and from 1050 nm to 1150 nm.

27 Claims, 17 Drawing Sheets

(51) Int. Cl.
*H01S 3/08* (2006.01)
*H01S 3/16* (2006.01)
*H01S 3/067* (2006.01)
*H01S 3/094* (2006.01)

(52) U.S. Cl.
CPC ........... *G02B 6/02347* (2013.01); *G02B 6/14* (2013.01); *H01S 3/06716* (2013.01); *H01S 3/06733* (2013.01); *H01S 3/094007* (2013.01); *H01S 3/1603* (2013.01); *H01S 3/1611* (2013.01); *H01S 3/08045* (2013.01)

(58) Field of Classification Search
CPC ............. H01S 3/094007; H01S 3/1603; H01S 3/1611; H01S 3/14; G02B 6/02338; G02B 6/02347; G02B 6/0238; G02B 6/14
See application file for complete search history.

(56) References Cited

U.S. PATENT DOCUMENTS

| | | | | |
|---|---|---|---|---|
| 5,048,026 | A * | 9/1991 | Shaw | H01S 3/094003 359/341.3 |
| 5,225,925 | A * | 7/1993 | Grubb | H01S 3/06708 359/341.32 |
| 5,244,846 | A * | 9/1993 | Onishi | C03C 3/325 372/6 |
| 5,253,322 | A * | 10/1993 | Onishi | H01S 3/0632 372/6 |
| 5,351,335 | A * | 9/1994 | Ohishi | C03C 4/0071 359/343 |
| 5,594,747 | A | 1/1997 | Ball | |
| 6,266,181 | B1 * | 7/2001 | Ohishi | C03C 3/122 359/341.1 |
| 6,304,711 | B1 * | 10/2001 | Samson | C03C 3/325 372/6 |
| 6,363,194 | B1 | 3/2002 | DiGiovanni et al. | |
| 6,469,825 | B1 * | 10/2002 | Digonnet | C03C 3/062 359/341.5 |
| 6,836,607 | B2 | 12/2004 | Dejneka et al. | |
| 6,961,497 | B2 | 11/2005 | Kim et al. | |
| 7,038,844 | B2 | 5/2006 | Dawson et al. | |
| 7,876,495 | B1 | 1/2011 | Minelly | |
| 7,999,228 | B2 | 8/2011 | Staniforth et al. | |
| 8,089,688 | B2 | 1/2012 | Lobo Ribeiro et al. | |
| 9,217,826 | B2 | 12/2015 | Logunov et al. | |
| 9,749,043 | B2 | 8/2017 | Perron | |
| 2003/0185505 | A1 | 10/2003 | Weisberg et al. | |
| 2003/0231380 | A1 * | 12/2003 | Gomes | H01S 3/06754 359/341.3 |
| 2005/0168804 | A1 * | 8/2005 | Dawson | H01S 3/06704 359/341.1 |
| 2009/0016387 | A1 | 1/2009 | Durkin et al. | |
| 2010/0315700 | A1 * | 12/2010 | Lobo Ribeiro | H01S 3/06795 359/341.3 |
| 2011/0188825 | A1 | 8/2011 | Alkeskjold | |
| 2012/0320451 | A1 | 12/2012 | Muendel | |
| 2013/0101261 | A1 * | 4/2013 | Cadier | C03B 37/01838 385/126 |
| 2017/0229834 | A1 | 8/2017 | Pax et al. | |

OTHER PUBLICATIONS

Chen et al., "Design of Add-Drop Multiplexer Based on Multi-Core Optical Fibers for Mode-Divisional Multiplexing," Optics Express, vol. 22, No. 2, 2014, pp. 1440-1451.
International Search Report and Written Opinion for PCT/US2017/015577, 12 pages.
Non-Final Office Action for U.S. Appl. No. 15/288,590, dated Oct. 11, 2017, 11 pages.
Alcock et al., "Tunable, Continuous-Wave Neodymium-Doped Monomode-Fiber Laser Operating at 0.900-0.945 and 1.070-1.135μm," Optics Lett., vol. 11, No. 11, 1986, pp. 709-711.
Aozasa et al., "1480-1510 nm-Band Tm Doped Fiber Amplifier (TDFA) with a High Power Conversion Efficiency of 42%," NTT Photonics Labs, NTT Electronics Corp., pp. PD1-PD3.
Bartolacci et al., "Effects of Ions Clustering in Nd3 +/Al3+-Codoped Double-Clad Fiber Laser Operating Near 930 nm," Appl. Phys. B., 98, 2010, pp. 317-322.
Clesca et al., "Raman Amplification for High-Capacity, Long-Haul Networking," Optics and Photonics News, 2015, pp. 34-39.
Dawson et al., "Scalable 11W 938nm Nd3+ Doped Fiber Laser," MD8, OSA/ASSP, 2004, 3 pp.
Dvoyrin et al., "Bismuth-Doped-Glass Optical Fibers—A New Active Medium for Lasers and Amplifiers," Optics Left., vol. 31, No. 20, 2006, pp. 2966-2968.
Hakimi et al., "Glass Fiber Laser at 1.36μm from Sio2:Nd," Optics Lett., vol. 14, No. 19, 1989, pp. 1060-1061.
Harun et al., "An Overview on S-Band Erbium-Doped Fiber Amplifiers," Laser Phys. Lett. 4, No. 1, 2007, www.lphys.org, pp. 10-15.
Htein et al., "Amplification at 1400-1450 nm of the Large-Core Nd-Doped Fiber by White LED Pumping," IEEE Photonics Tech. Lett., vol. 25, No. 11, 2013, pp. 1081-1083.
Ishikawa et al., "Laser Emission and Amplification at 1.3μm in Neodymium-Doped Fluorophosphate Fibres," Electron. Lett., vol. 28, No. 16, 1992, pp. 1497-1499.
Kane et al., "3-Watt Blue Source Based on 914-nm Nd:YVO4 Passively-Q-Switched Laser Amplified in Cladding-Pumped Nd:Fiber," OSA/ASSP, 2004, 3 pp.
Komukai et al., "Highly Efficient and Tunble Nd3+ Doped Fluoride Fibre Laser Operating in 1.3pm Band," Electron. Lett., vol. 29, No. 9, 1993, pp. 755-758.
Laroche et al., "20 W Continuous-Wave Cladding-Pumped Nd-Doped Fiber Laser at 910 nm," Optics Lett., vol. 38, No. 16, 2013, pp. 3065-3067.
Lumholt et al., "Optimum Placement of Filters in 1300 nm Nd-Fibre Amplifiers," Optics Comm., Elsevier Science Publishers, vol. 89, 1992, pp. 30-32.
Mears et al., "Neodymium-Doped Silica Single-Mode Fibre Lasers," Electron. Lett., vol. 21, No. 17, 1985, pp. 738-740.
Miniscalco et al., "1.3μm Fluoride Fibre Laser," Electron. Lett., vol. 24, No. 1, 1987, pp. 28-29.
Miyajima et al., "1.31-1.36μm Optical Amplification in Nd3+-Doped Fluorozirconate Fibre," Electron. Lett., vol. 26, No. 3, 1990, pp. 194-195.
Morkel et al., "Spectral Variation of Excited State Absorption in Neodymium Doped Fiber Lasers," Optics Comm., vol. 67, No. 5, 1988, pp. 349-352.
Naftaly et al., "ND3+-Doped Fluoraluminate Glasses for a 1.3μm Amplifier," J. of App. Phys., vol. 87, No. 5, 2000, pp. 2098-2104.
Pax et al., "Scalable Waveguide Design for Three-Level Operation in Neodymium Doped Fiber Laser," Unpublished Document, 12 pp.
Payne et al., "Progress in the Development of Efficient 1.3μm Fibre Amplifiers," ECOC, 1998, pp. 11-13.
Poole, et al., "Fabrication of Low-Loss Optical Fibres Containing Rare-Earth Ions," Electron. Left., vol. 21, No. 17, 1985, pp. 737-738.
Reekie et al., "Tunable Single-Mode Fiber Lasers," J. of Lightwave Tech., vol. LT-4, No. 7, 1986, pp. 956-960.
Soh et al., Neodymium-Doped Cladding-Pumped Aluminosilicate Fiber Laser Tunable in the 0.9-μm Wavelenth., IEEE J. of Quantum Elect., vol. 40, No. 9, 2004, pp. 1275-1282.
Thipparapu et al., "Bi-Doped Fiber Amplifier with a Flat Gain of 25 dB Operating in the Wavelength Band 1320-1360 nm," Optics Lett., vol. 41, No. 7, 2016, pp. 1518-1521.
Zemon et al., "Excited-State-Absorption Cross Sections and Amplifier Modeling in the 1300-nm Region for Nd-Doped Glasses," IEEE Photonics Tech. Lett., vol. 4, No. 3, 1992, pp. 244-247.
International Search Report and Written Opinion for PCT/US2017/054181 corresponding to U.S. Appl. No. 15/288,810, 12 pages.

* cited by examiner

ND³⁺ FIBER LASER AND AMPLIFIER

CROSS-REFERENCE TO RELATED APPLICATIONS

This application claims the benefit of U.S. Provisional Patent Application No. 62/291,483 titled "Waveguide Design for Line Selection in Fiber Lasers and Amplifiers," filed Feb. 4, 2016, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National laboratory.

BACKGROUND OF THE INVENTION

Field of the Invention

The present invention relates to fiber lasers and amplifiers, and more specifically, it relates to $Nd^{3+}$ fiber lasers and amplifiers.

Description of Related Art

Fiber lasers and amplifiers are the subject of significant research and have been since University of Southampton demonstrated the potential for low loss rare earth doped optical fibers in 1985 and the subsequently demonstrated gain and lasing in both Neodymium and Erbium doped silica optical fibers. The primary driver of research efforts in optical fiber amplifiers in the late 1980s and early 1990s was the major impact on bandwidth of fiber optic communication systems enabled by wavelength division multiplexing and erbium fiber amplifiers. Optical titer amplifiers enable long haul transmission of many optical channels without the high cost of detecting each individual channel, electronically amplifying and then modulating a laser and recombining the channels every 15-20 km. Instead, a single erbium fiber amplifier restores the optical signal power across all transmission channels in a single compact, efficient and low cost device. C and L band erbium fiber amplifiers provide amplification across 1525 nm to 1620 nm. WDM channel spacing as small as 50 GHz enables a single optical fiber to achieve an information carrying capacity on the order of Tb/s. Early research in erbium fiber amplifiers is well summarized in a number of books specifically on this topic and these amplifiers are now technologically mature.

During the same time period when erbium fiber amplifiers were being developed, significant research and development was also put into developing a rare earth doped fiber amplifier in the 1300-1500 nm telecom window referred to as the O, E and S-bands. However, amplifiers in this wavelength, range have not had the same commercial impact due to efficiency concerns or because they are based upon non-fused silica glasses, which are generally perceived to be more difficult to integrate into the fiber optic network due to differences in the material properties between them and the fused silica material of the rest of the network.

Fiber amplifiers at wavelengths from 1300 nm to 1530 nm fall into several categories. Raman amplifiers are the top contenders and ran attain a wide array of wavelengths as amplification occurs 13.2 THz from the pump wavelength, which can be picked arbitrarily. However, Raman amplifiers require long fiber lengths and high power pump lasers. S-band titer amplifiers based upon erbium and thulium have been studied extensively. In the erbium case, depressed-well fiber geometries are employed to suppress the much higher gain at >1530 nm, but require operating at very high inversions as the emission cross section is significantly less than the absorption cross section at these wavelengths in addition to added losses and fabrication challenges imposed by the depressed-well waveguide design. In the thulium case, research and development efforts have focused on non-fused-silica fibers as the decay from the upper level laser state is faster than the decay from the lower state, making this laser transition self-terminating in fused silica. Recently, bismuth doped fiber amplifiers have emerged as a possible fiber amplifier in the 1320-1360 nm region. However, these amplifiers remain relatively low in optical efficiency and require long fiber lengths. Praseodymium and neodymium were extensively researched for amplification in the E and O band (1300-1450 nm). Praseodymium worked well only in fluoride based fibers.

Neodymium doped fiber lasers and amplifiers in the 1320-1450 nm wavelength range would appear to have some significant attractions as this transition line $^4F_{3/2}$ to $^4I_{13/2}$ is a 4-level laser line and thus has no ground state absorption issues. FIG. 1 is a simplified energy level diagram of the relevant $Nd^{3+}$ transitions. However, this transition also has significant drawbacks that have limited its utility. First, in fused silica as well as other materials, there is a well-known excited state absorption (ESA) from the $^4F_{3/2}$ state that creates a net optical loss when the laser amplifier is pumped, especially in the region from 1300-1350 nm. The status of the 1350-1390 nm region is less clear as it appears to be convolved with the 1380 nm spectral absorption due to OH. Even with these limitations, net gain (10 dB) and lasing (~10 mW) has been demonstrated though positive gain occurs well beyond the fluorescence peak where the emission cross-section is highest. The lower cross sections complicate the other key challenge of operation on the $^4F_{3/2}$ to $^4I_{13/2}$ transition, which is competition from the preferred transitions $^4F_{3/2}$ to and $^4F_{3/2}$ to $^4I_{11/2}$. It is desirable to provide spectral filtering of the $^4F_{3/2}$ to $^4I_{11/2}$ transition to improve performance of a neodymium-doped fiber on the $^4F_{3/2}$ to $^4I_{13/2}$ transition.

SUMMARY OF THE INVENTION

An embodiment of the invention is a $Nd^{3+}$ optical fiber laser and amplifier operating in the wavelength range from 1300 to 1500 nm. Another embodiment operates from 1370 to 1460 nm. These embodiments utilize a rare earth doped optical amplifier or laser operating within this wavelength range and is based upon an optical fiber that guides light in this wavelength band. The fiber includes a waveguide structure that attenuates light selectively in the wavelength range from 850 nm to 950 nm and from 1050 nm to 1150 nm. The attenuation coefficient of the fiber is set to be above the gain coefficient of the $Nd^{3+}$ optical transitions at these wavelengths. The absolute value of the attenuation at these wavelengths will depend upon the doping concentration of the $Nd^{3+}$ in the core of fiber and, in some cases, will depend upon the total pump power. This configuration for enabling net loss at key wavelengths precludes amplified spontaneous emission at these wavelengths from reducing the population inversion of the $Nd^{3+}$ ions. This in turn enables amplification in the 1300-1500 nm wavelength region. This region normally does not have significant gain due to competition with the other, stronger laser lines. Embodiments of the invention form an optical fiber amplifier at wavelengths useful to the telecommunications industry.

An embodiment of the present invention produced 1.2 W of laser amplification at 1427 nm on the $^4F_{3/2}$ to $^4I_{13/2}$ spectral line in a $Nd^{3+}$ doped fused silica optical fiber. A 9.3 dB improvement in optical gain and a 100× improvement in total optical power over prior published experimental results from the $^4F_{3/2}$ to $^4I_{13/2}$ transition in an $Nd^{3+}$ doped fused, silica optical fiber was demonstrated. This is enabled via an optical fiber waveguide design that creates high spectral attenuation in the 1050-1150 nm-wavelength range, a continuous spectral filter for the primary $^4F_{3/2}$ to $^4I_{11/2}$ optical transition. A maximum output power at 1427 nm of 1.2 W was attained for 43 mW coupled seed laser power and 22.2 W of coupled pump diode laser power at 880 nm for a net optical gain of 14.5 dB. Reducing the coupled seed laser power to 2.5 mW enabled the system to attain 19.3 dB of gain for 16.5 W of coupled pump power. Four issues limited results; non-optimal seed laser wavelength, amplified spontaneous emission on the $^4F_{3/2}$ to $^4I_{9/2}$ optical transition, low absorption of pump light from the cladding and high spectral attenuation in the 1350-1450 nm range. Future fibers that mitigate these issues should lead to significant improvements in the efficiency of the laser amplifier, though the shorter wavelength region of the transition from 1310 nm to >1350 nm is still expected to be limited by excited state absorption.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
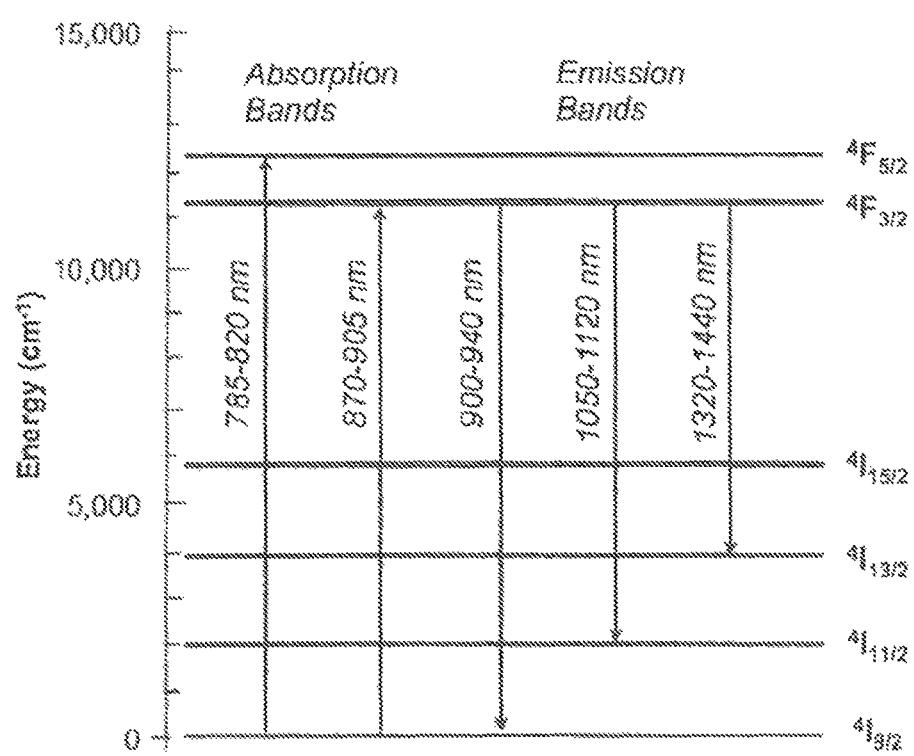
FIG. 1 is a simplified energy level diagram for $Nd^{3+}$ in fused silica.

An embodiment of the present invention has provided the first experimental demonstration of a neodymium doped fused silica optical fiber amplifier operating on the $^4F_{3/2}$ to $^4I_{13/2}$ transition by employing a continuous spectral filter of the $^4F_{3/2}$ to $^4I_{11/2}$ transition while still guiding light in the wavelength range from 1300-1500 nm. The 1.2 W amplified power at 1427 nm produced in this demonstration is two orders of magnitude greater than prior published fiber lasers operating on this transition. Further, the 19.3 dB small signal gain reported here is 9.3 dB higher than the best previous neodymium fiber amplifier result on this transition. This disclosure teaches the fiber design and discusses current limitations, the experimental set-up employed to demonstrate gain and amplification, on this laser transition and the significant potential for improvement in future fibers of similar design. FIG. 1 is a simplified energy level diagram for $Nd^{3+}$ in fused silica. Each energy level is a homogeneously broadened multiplet of states. The nominal absorption and emission wavelengths are denoted as a band rather than simply noting the peak.

The results presented herein employ a $Nd^{3+}$ doped optical fiber developed for amplifiers and lasers in the 900-930 nm wavelength range. The present inventors have sought to improve over prior designs that rely either upon a large core to clad ratio or a depressed-well geometry. The large core to clad ratio scheme is limited in overall pump cladding size by the requirement that the pump cladding diameter not be much bigger than 4× the core diameter. The depressed-well scheme is limited to <10 μm in core diameter by the requirement the 1 μm light be able to tunnel through the depressed well into the cladding. Thus, as the pump cladding is progressively increased, the fiber becomes progressively longer in order to be efficient. Some embodiments of the present invention use micro-structured optical fibers to overcome these limitations.

Figure 2:
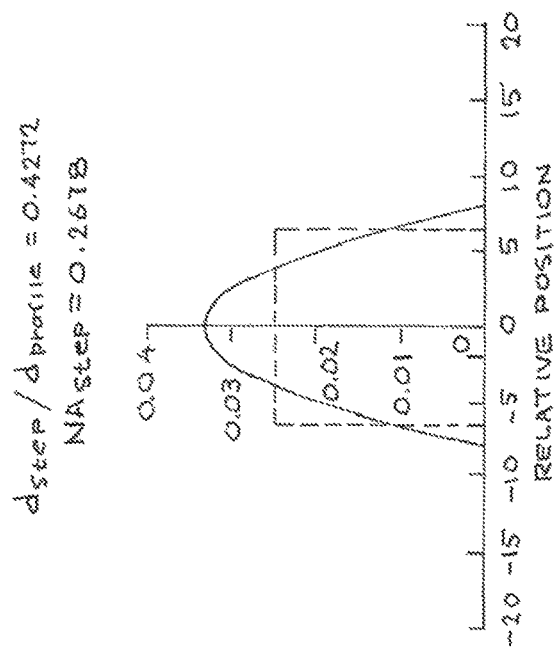
FIG. 2 shows an end-face of a $Nd^{3+}$ doped fused silica fiber.
Figure 2:
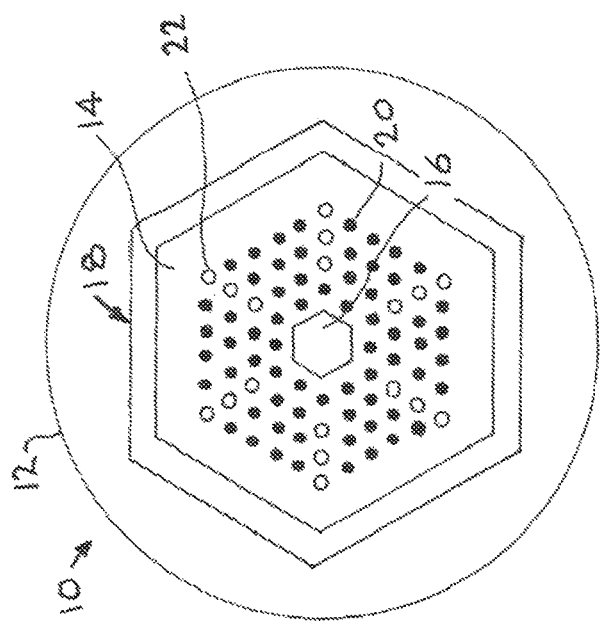

A picture of the end face of an embodiment fiber is shown in FIG. 2. The overall fiber 10 has a round shape and the outer glass 12 diameter is 240 μm, the inner pump cladding 14 is hexagonal with a face-to-face dimension of 118 μm and a corner-to-corner dimension of 136 μm. The core 16 is also hexagonal with a face-to-face dimension of 21 μm and a corner-to-corner dimension of 24 μm. The micro-structure comprising the core and pomp cladding was fabricated from a stack of 217 canes, 17 canes corner to corner that are surrounded by tubes that are pressurized with air (air cladding 18) during the draw process to form a pump cladding with an NA of 0.4 at 880 μm. As fabricated the pitch of the micro-structured elements is 8 μm. The dark lattice elements 20 are Fluorine-doped rods to provide a reduced index. The light lattice elements 22 are GRIN elements.

The inner rod and 1$^{st}$ inner ring (7 elements total) of the core are $Nd^{3+}$ doped glass matched in refractive index to fused silica. This was achieved by procuring a $Nd^{3+}$ doped preform with large core to clad ratio from Optacore SA that had an initial doping level corresponding to 200 dB/m of absorption at 808 nm and likely in the realm where there is significant concentration clustering of the $Nd^{3+}$ ions. Canes drawn from this preform were incorporated into a stack and draw preform that contained additional silica and Chlorinated rods drawn from other preforms. This assembly was designed such that the area weighted refractive index of all components was matched to that of the refractive index of fused silica to <$10^{-4}$. The assembly was then drawn into rods restacked and drawn again to further reduce the feature size. The final rods were incorporated into the preform that produced the fiber in FIG. 2 and it was estimated that the feature sizes of the final rods are on the order of 25 nm. It was estimated that the effective concentration of $Nd^{3+}$ ions was reduced by 5× due this process i.e., 40 dB/m at 808 nm. It is not known whether the process had any impact on the probable clustering we suspect existed in the original preform.

The next four rings of the microstructure are a combination of fluorinated depressions 20 (dark colored) and GRIN inclusions 22 (light colored). The fluorinated depressions are 0.533 center to outside ratio with an index depression of −0.0068 relative to fused silica and are incorporated in lieu of air holes making the structure easier to fabricate and easier to handle as the final structure has the potential to be all-solid. The fluorinated depressions define the waveguide and are seen in FIG. 2 as darkened spots. The 18 bright spots radiating from the corners of the core are GRIN inclusions fabricated from a commercial GRIM preform suitable for fabricating 62.5/1.25 μm standard, multimode GRIN fiber. These inclusions are resonant with the core in the 1020-1130 nm wavelength range and draw light at these wavelengths out of the core and leak it into what is effectively a reservoir of a large number of modes formed by the outer three rings of the pump cladding. The rods that form the fluorinated depressions and the GRIN inclusions were obtained as bulk preforms fabricated via plasma chemical vapor deposition (PCVD) from Prysymian and drawn into canes for incorporation into the final preform. The outer region is formed from Hereaus F300 fused silica rods.

The microstructure is surrounded by a final ring of capillary holes (air cladding 18) that can be pressurized during the draw process to enable the formation of a pump cladding with a numerical aperture of ~0.4 at 880 nm. Fiber samples with and without capillary holes were drawn. The samples without capillary holes were useful for assessing core spectral attenuation. The samples with capillary holes were used in the laser and amplifier experiments described below.

Figure 3:
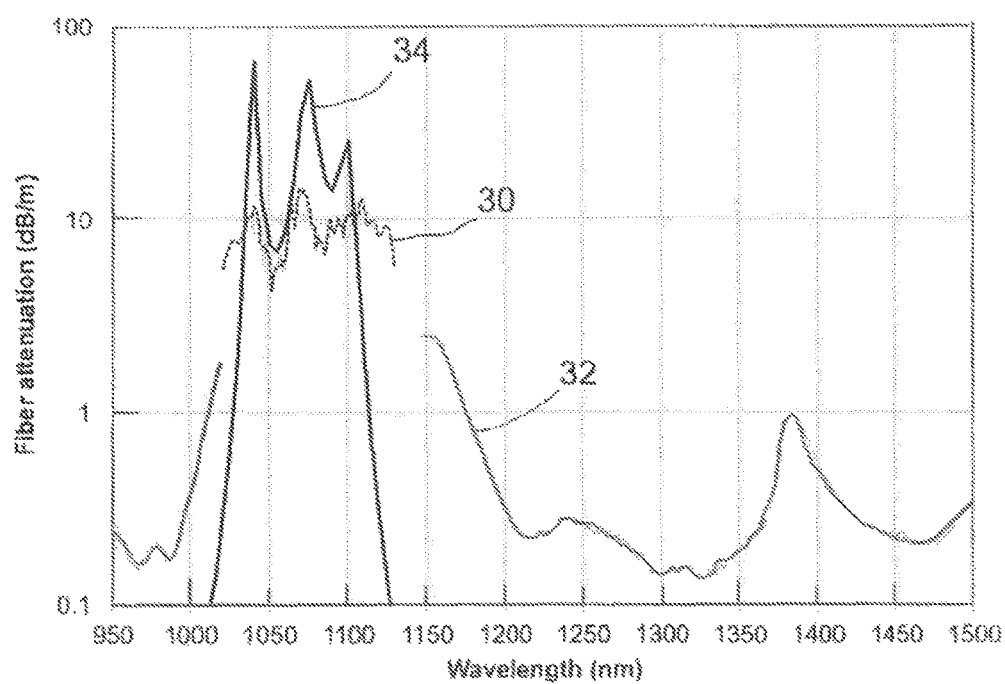
FIG. 3 shows the spectral attenuation of core of $Nd^{3+}$ doped optical fiber.

FIG. 3 shows the measured spectral attenuation of the single clad version of the fiber shown in FIG. 2 above. The attenuation below 950 nm was too high to measure due to the ground state absorptions. The spectral attenuation was measured using a super-continuum white light source, a monochromer, a lock-in amplifier and photo-detectors via the standard cut-back technique with the exception that the end face was imaged onto an iris preceding the photo-detector that blocked light guided by the GRIN inclusions. Two measurements were made; line 30 in FIG. 3 was derived from a cutback on a short piece of fiber that permitted assessment of the high (~10 dB/m) attenuation region between 1020 nm and 1130 nm. A cutback on a longer piece permitted assessment of the losses outside this region. The assessment is depicted by line 32. For reference, the line 34 with greater dynamic range is the theoretical estimate of the anticipated attenuation of the waveguide in the 1020-1130 nm wavelength region.

In addition to the desired high spectral attenuation in the 1020-1130 nm-wavelength range, the fiber exhibits an abnormally high 1380 nm OH peak of 1 dB/m or 1000 dB/km. The original Optacore $Nd^{3+}$ doped glass did not contain an OH peak of this magnitude. We estimate the OH peak of the starting glass to be much smaller (<50 dB/m). We believe the core glass was contaminated with OH during the extensive processing to match its index to fused silica. We do not believe this contamination is intrinsic to the process. We strongly believe the high OH peak is preventable and is limiting the results reported below. The spectral attenuation measurement suggests a core loss of 0.27 dB/m at 1427 nm (the wavelength at which our amplifier experiments below are performed). However, a direct cutback using the seed laser suggests the actual losses are closer to 0.18 dB/m at this wavelength. We believe this discrepancy to be within, the error of our loss measurement, which was clone on a relatively short length of fiber (~100 m). The loss (equivalent to 180 dB/km) is still extremely high for an optical fiber and certainly limiting the laser amplifier results in a number of ways.

Figure 4:
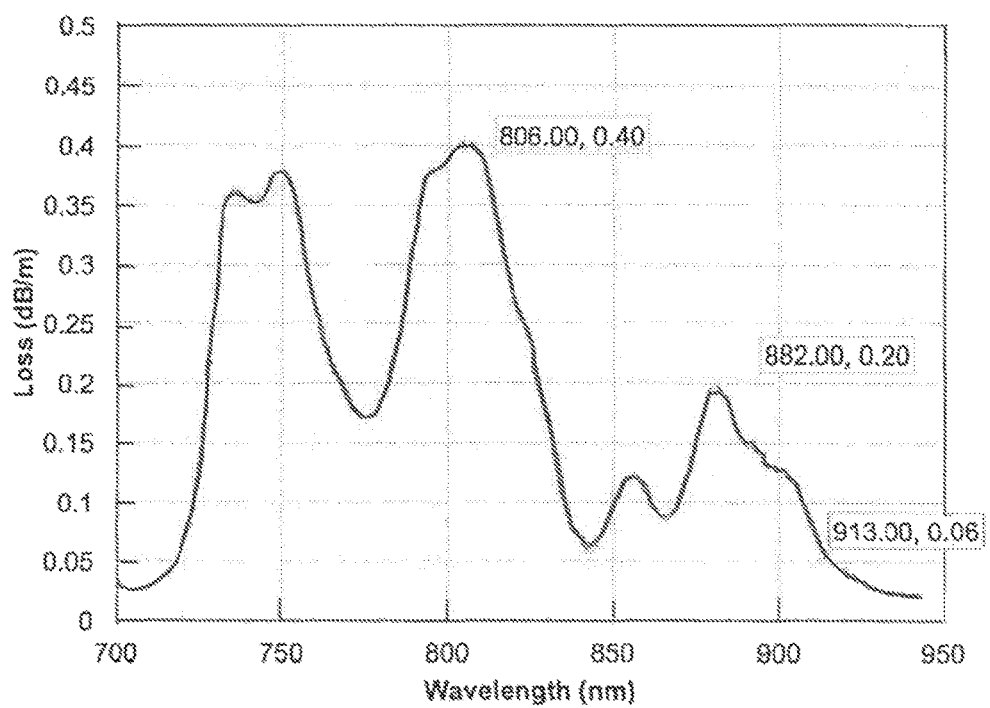
FIG. 4 shows measured absorption of the pump cladding.

The pump cladding absorption was measured via the cutback technique on a double clad sample of the fiber and the results are shown in FIG. 4. The absorption is roughly one third of what we estimate it should be based upon the expected core absorption and the pump cladding-to-core area ratio of 31. One may be concerned the GRIN inclusions are trapping pump light. However, the GRIN inclusions are only 1% of the total effective area of the pump cladding region. The low pump absorption is a result of light being partially trapped in the silica region between the outermost ring of fluorinated depressions and GRIN inclusions and the air cladding.

The 808 nm absorption peak, the most common $Nd^{3+}$ pump wavelength, is 0.39 dB/m. A 30 m length of fiber will absorb roughly 11.7 dB of 808 nm pump light. The 880 nm absorption peak which absorbs light directly into the $^4F_{3/2}$ upper level laser state is only 0.2 dB/m absorption meaning a 60 m piece of fiber is required to attain the same small signal pump absorption. It will be shown below that despite the longer length, the 880 nm pump absorption peak is preferred in this fiber for lasing on the $^4F_{3/2}$ to $^4I_{13/2}$ transition because it reduces the average inversion of the fiber, which minimizes amplified spontaneous emission on the $^4F_{3/2}$ to $^4I_{9/2}$ transition at 900-940 nm, which is a limit on our current results. Once this transition is also suppressed, the 808 nm pump line may be preferred as fibers ½ the length can be employed to attain the same pump absorption. Also called out in FIG. 4 is the pump absorption at 913 nm. We attempted core pumping of the fiber with 2 W of pump at both 910 nm and 923 nm using a separate piece of this fiber lasing at these wavelengths. However, we saw no signs of gain on the $^4F_{3/2}$ to $^4I_{13/2}$ transition when the fiber was pumped at these wavelengths. We tentatively conclude that the attainable inversions at these wavelengths are insufficient to provide enough gain to overcome the 0.17 dB/m core loss in this fiber sample. To this end, we considered, but did not attempt cladding pumping of the fiber at 915 nm.

Figure 5:
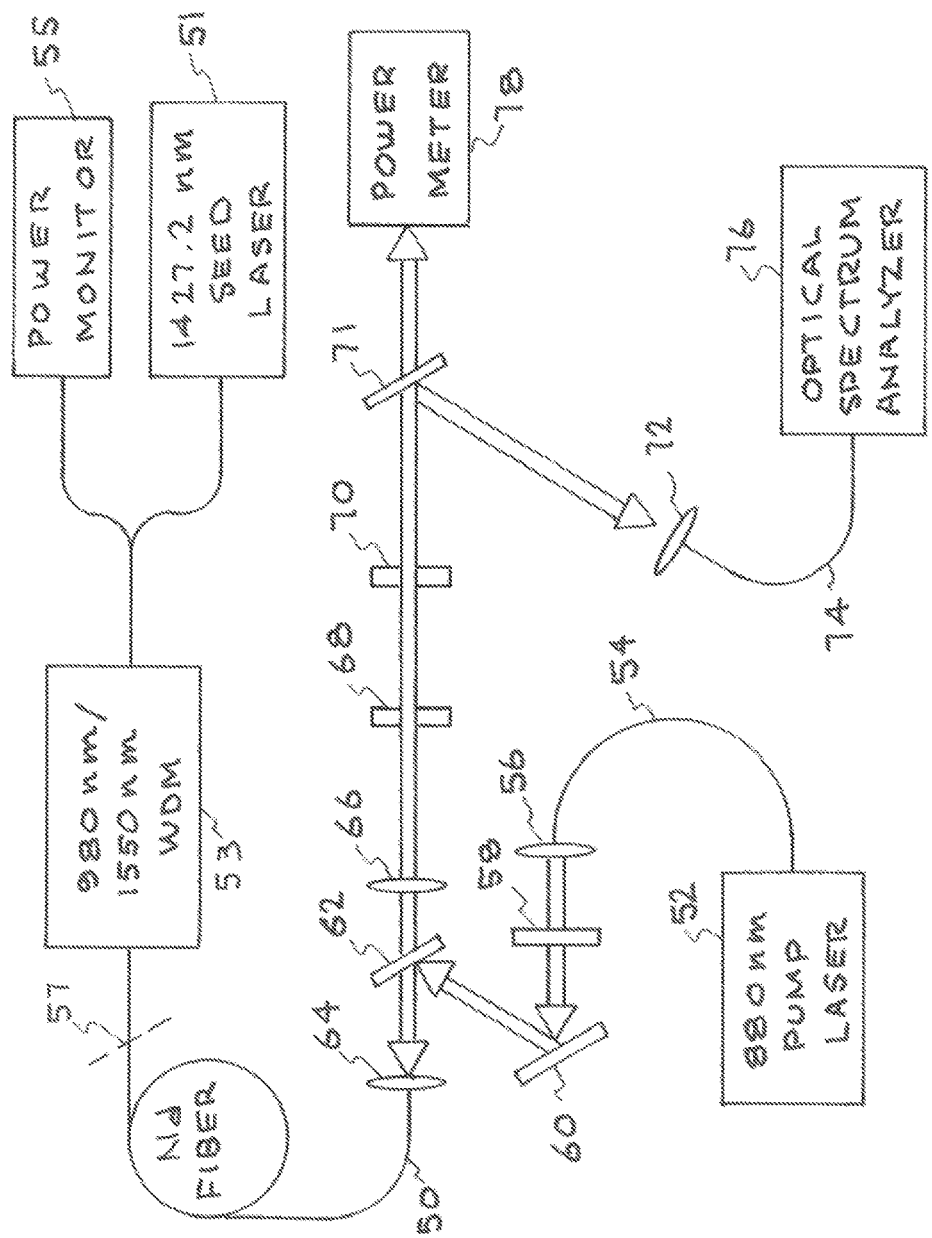
FIG. 5 shows a block diagram of an experimental set-up.

FIG. 5 illustrates the baseline experimental set-up for testing the fiber. We performed two sets of tests. Reported first are measurements of the fluorescence spectrum from the core of the fiber as a function of coupled pump power. Reported further below are gain and power measurements from the seeded fiber amplifier. The $Nd^{3+}$ fiber 50 was pumped with an 880 nm Dilas laser diode 52 coupled to a 200 μm/0.22 NA multimode optical fiber 54. A 40 mm focal-length plano-convex lens 56 from Thorlabs with a B-type AR coating collimated the output of this diode. The pump light was passed through an iris 58 to limit the numerical aperture of the light coupled to the fiber. The pump light was then reflected off two Semrock long pass filters (60,62) at 35° angle of incidence in order to separate the output of the fiber from the pump light and minimize transmission of light from the fiber back into the pump laser diode. At 35° angle of incidence, the Semrock filter's 50% reflectivity point is at 900 nm. The pump light was then coupled into the neodymium fiber 50 using a 20 mm focal length aspheric lens 64 from Thorlabs again with a B-type AR coating that we measured to have transmission of 88% at 1427 nm.

The pump end of the neodymium fiber was prepared by collapsing the air holes forming the pump cladding using an optical fiber fusion splicer and then angle cleaving (about 10 degrees) the fiber as close as possible to the end of the region with inflated holes. Coupled pump power was determined via direct measurement by cutting the fiber to 2 m at the completion of testing. Due to the method by which the fiber input was prepared, the output from the fiber core was not well collimated by the input lens when the pump coupling was optimized. To compensate for this, an additional 500 mm focal length C-coated biconvex lens 68 from Thorlabs was positioned approximately 355 mm from the 20 mm input lens. This re-imaged the fiber end onto the first iris 68 at approximately 520 mm from the 500 mm lens. This iris was employed to screen out fluorescence guided by the pump cladding. A second iris 70, which was 250 mm further down the beam path, was employed to block non-core light making it through the first iris. For the purpose of this experiment, the core light was then coupled into an SMF-28 fiber 74 using an 8 mm Thorlabs C-coated asphere 72 and connected to an optical spectrum analyzer 76 for assessment of the fluorescence spectra of the fiber. The output end of the fiber was terminated similar to the input end and a power meter 78 was employed to optimize the pump coupling. The rest of the experimental set-up will be described below. Note that FIG. 5 shows the core beam as being coupled, to a power meter, however this was done for the power and gain testing, not for the fluorescence measurements.

Figure 6:
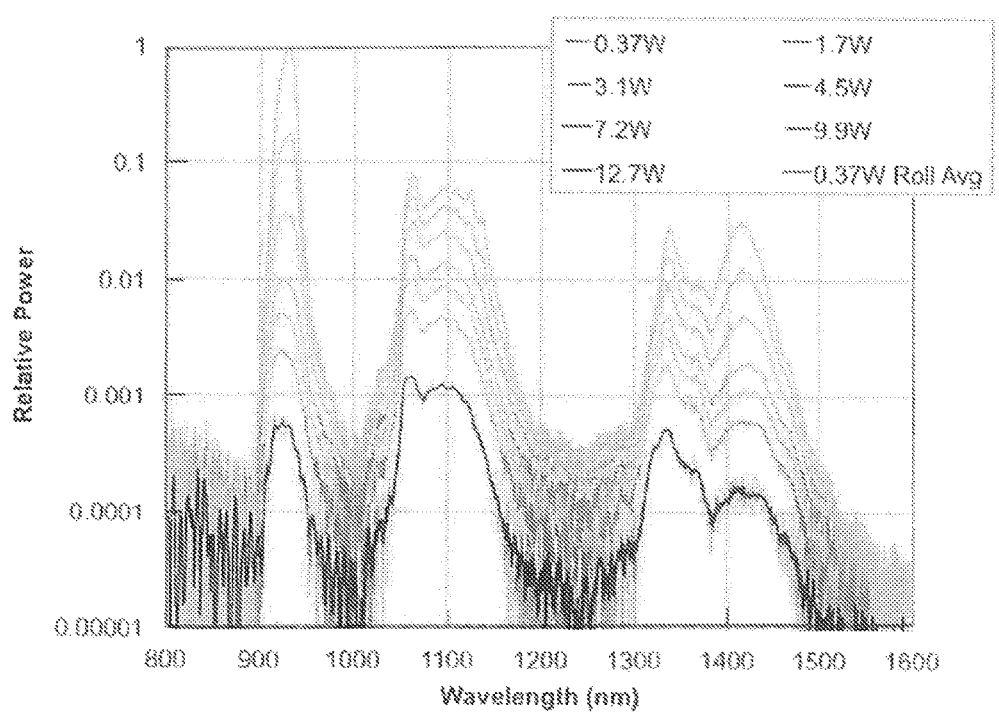
FIG. 6 shows core fluorescence as a function of coupled 880 nm pump power.

FIG. 6 plots the fluorescence spectra as function of coupled 880 nm pump power from the output of a 60 m-neodymium fiber sample. As expected for this fiber, a strong increase in the 930 nm fluorescence as a function of pump power is observed. The fluorescence intensity at 930 nm for 12.7 W pump power is 1860× stronger than the fluorescence intensity at 0.37 W pump power. As the pump power has increased by only 34.3×, this is a clear sign of amplified spontaneous emission at 930 nm. In the 1050-1150 nm wavelength range a similar comparison of fluorescence intensity reveals only a 56× increase in fluorescence intensity suggesting little or no net gain in this region. (There was some regrettably unavoidable alignment drift between the neodymium fiber and the single mode fiber coupling light to the core during the measurement due to heating of the fiber mount by uncoupled pump light. The curves were taken starting with the highest power and then successively decreasing the power. Thus alignment was best at the highest power and likely slightly worse at the lowest power. We believe this to be the reason the fluorescence intensity appears to increase slightly faster than the pump power across the spectrum.) This is consistent with our assertion that the waveguide design has spectral attenuation in the 1050-1150 nm wavelength range sufficient to fully suppress the expected gain. Similarly, the fluorescence peak at 1337 nm shows only a 56× increase in total intensity again consistent with no net gain, this is most likely due to excited state absorption. However, the wavelength region from 1380-1450 nm is evolving very differently from the 1330-1380 nm wavelength region. The fluorescence spectra in this region is clearly increasing non-linearty with pump power and at both 1400 nm and 1420 nm the fluorescence increases by 186× compared to the initial fluorescence power. This is 10× less than the increase at 930 nm, but still sufficiently high to conclude there is amplified spontaneous emission (ASE) in this wavelength region.

Figure 7:
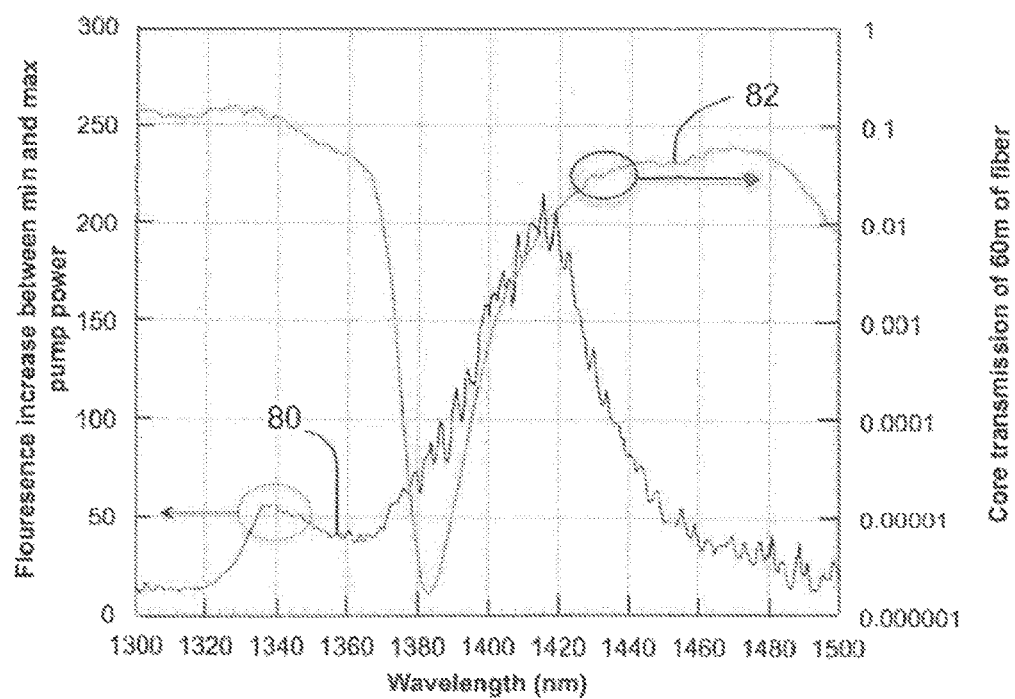
FIG. 7 shows increase in fluorescence in the 1300-1500 nm wavelength region for an increase in pump power of 34.3×.

FIG. 7 shows an increase in fluorescence in the 1300-1500 nm wavelength region for an increase in pump power of 34.3× (0.37 W to 12.7 W coupled pump at 880 nm into a 60 m long fiber) (line 80). The core transmission of a 60 m long fiber (line 82) is plotted on the second y-axis to illustrate the rapidly changing fiber loss in this wavelength region. We assert that an increase of >60 in fluorescence in this figure is convincing evidence of net gain. Thus, FIG. 7 plots the ratio of the fluorescence intensity measured at 12.7 W coupled pump power to the rolling average of the measured fluorescence intensity at 0.37 W of coupled pump power (line 80, left vertical axis, linear range). In order to highlight the effect of the OH induced loss in this particular fiber sample, the spectral attenuation data from FIG. 3 was used to calculate the net transmission of a 60 m length of this neodymium fiber (line 82, right vertical axis, logarithmic range). Based upon our estimates of the increase in the fluorescence in the regions where we do not expect net gain is ~56×, we assert that regions of the plot where the increase in the fluorescence intensity is >60× denotes the region of positive gain. Note there is a strong correlation between the rising gain from 1370 nm to 1414 nm and the exponentially rising fiber transmission in the same region. This suggests an improved fiber with reduced OH will be capable of significant gain possibly as short at 1360 nm. Thus an improved neodymium fiber based upon this design may have an amplification window as large as 80 nm.

Figure 8:
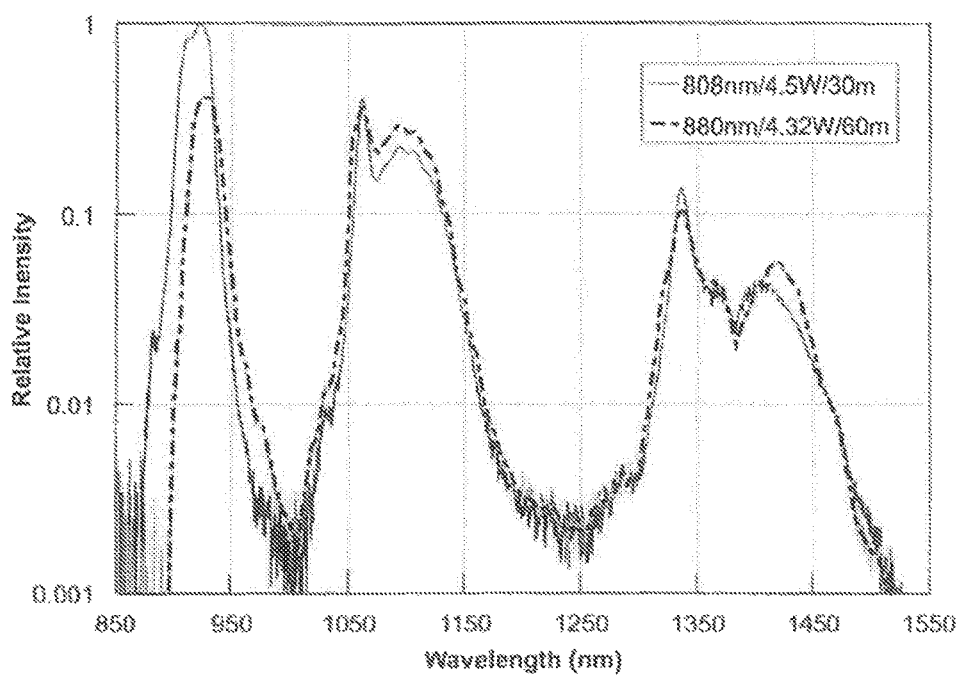
FIG. 8 is a comparison of neodymium fiber fluorescence for 808 nm and 880 nm pumping at the same nominal pump power and the same nominal small signal absorption from the cladding.

FIG. 8 compares the fluorescence spectrum from the core of this fiber for 4.32 W coupled pump power at 880 nm into a 60 m long fiber (note this curve was taken on a different day than the FIG. 7 data) to the fluorescence spectrum from the core of another piece of fiber that is 30 m long and pumped with 4.5 W of coupled 808 nm diode laser light. In this case, the Dilas laser diode in FIG. 5 was replaced by a LIMO laser diode (LIMO25-F100-DL808). The LIMO laser diode was coupled to a 100 μm/0.22 NA core fiber and the Semrock filters were adjusted to 45° angle of incidence to move the 50% transmission point to 875 nm. The different neodymium fiber lengths were chosen in order to equalize the pump absorption in the two cases. As the fluorescence spectra were taken on different days using different experimental arrangements, we normalized both curves to 1 at their fluorescence peaks and then uniformly attenuated the 880 nm data in order to align the fluorescence power from the two curves in the region between 975 nm and 1300 nm. FIG. 8 illustrates clearly that the 900-950 nm fluorescence peak is much stronger for the 808 nm pump than the 880 nm as one would expect due to both improved transmission of the dichroic filter and clue to the higher average inversion in the fiber. However, the fluorescence spectrum between 1380 nm and 1450 nm shows superior gain on the $^4F_{3/2}$ to $^4I_{13/2}$ line for the 880 nm pump. We attribute this to lower average inversion and thus less power is lost to the $^4F_{3/2}$ to $^4I_{9/2}$ transition improving the gain on the transition we are investigating. We contend an improved fiber with deliberate spectral attenuation from 850-1150 nm, when combined with reduced OH as discussed above, will enable significant gain in the 1360-1440 nm range.

Referring again to FIG. 5, once the fluorescence spectrum measurements shown in FIG. 6 was completed, a 1427 nm seed beam from diode laser source 51 was launched into the core of the 60 m piece of neodymium fiber 50 counterpropagating to the direction of the beam from pump laser 52. An optical isolator was not available for this diode laser. In order to protect the laser from significant backward propagating light in the 900-950 nm wavelength range, the output of the diode laser was fusion spliced to a standard 980/1550 nm telecom wavelength division multiplexer (WDM) 53 used for the construction of erbium doped fiber amplifiers. The measured insertion loss of the WDM was 3 dB at 1427 nm and 1.2 dB at 905 nm. The 980 nm port of the WDM was aligned to an optical power meter 55 to permit a relative assessment of backward propagating light in the 900-950 nm region during the tests. The output of the WDM was fusion spliced directly to the neodymium fiber and the splice was potted into a copper V-groove using a high index optical quality polymer. This assembly 57 provided a convenient place to dump excess pump light transmitted through the neodymium fiber. We note that the WDM is made from HI 1060 FLEX fiber which is not well mode-matched to the 20 μm, low NA core of this neodymium fiber. Thus we anticipated and measured very high splice loss. The spike toss was calibrated at the end of the measurement campaign by cutting the fiber length back to 2 m and measuring the collimated 1427 nm signal using the fiber launch, lenses and irises shown in FIG. 5.

As noted in FIG. 5, the light from the output of the neodymium fiber was stripped of stray cladding light using two irises and then measured with an optical power meter. Output power vs. pump power was measured both with and without a Semrock LP02-980RS-25 long pass filter 71, which has 50% transmission at 980 nm for 45° angle of incidence. This filter enabled measurement of only power longer than 980 nm eliminating the strong ASE in the 900-950 nm wavelength region observed at high pump power. When the Semrock filter was not in line, an uncoated fused silica wedge was put in its place and the light from the front surface reflection was coupled to an SMF-28 fiber and then to an optical spectrum analyzer.

Figure 9:
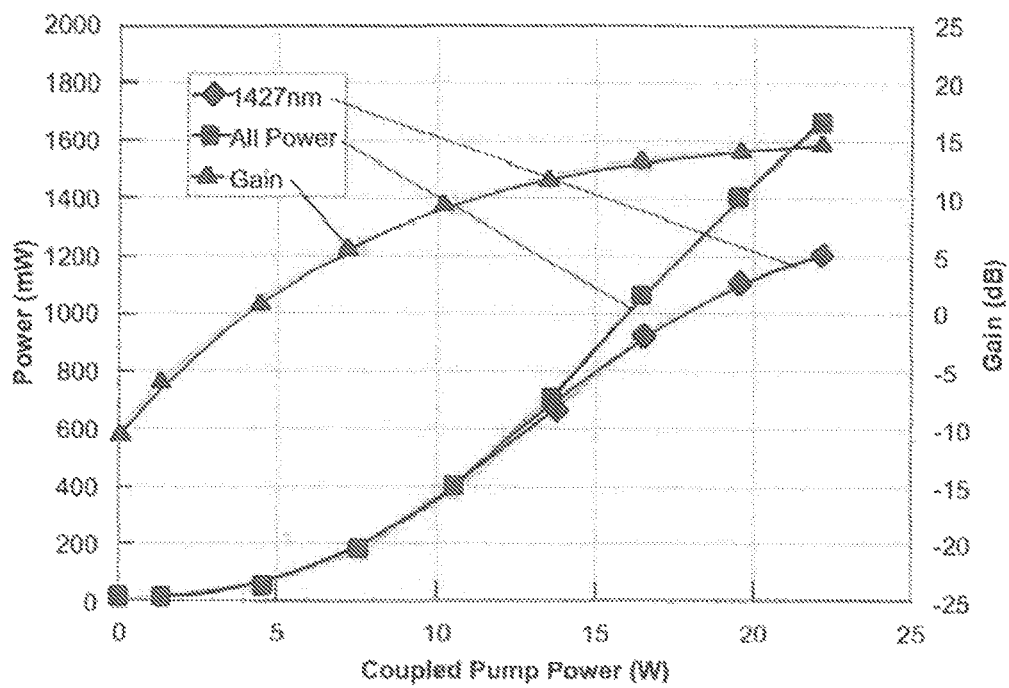
FIG. 9 shows power and gain vs. coupled pump power for 43 mW of 14.27 nm launched signal light.
Figure 10:
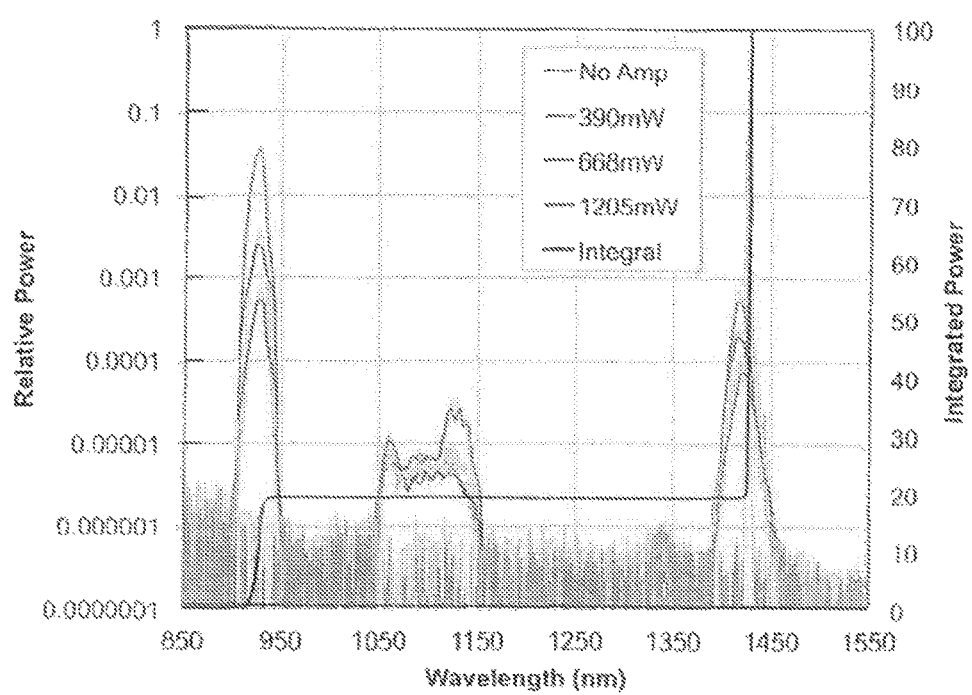
FIG. 10 shows the measured output spectra of 1427 nm amplifier at selected power.

FIG. 9 plots measured power vs. coupled pump power for the case of the LP02-980RS-25 filter in place and the case of the uncoated wedge in the filter's place. The loss of these filters was accounted for in the data analysis. The gain was then computed based upon the launched 1427 nm power of 43 mW. The maximum output power was limited by the onset of parasitic lasing at 930 nm. The 1427 nm power effectively clamped at this point and we did not proceed to increase the pump power further due to concerns about damaging the seed laser. Points containing 930 nm parasitic lasing are not plotted. The backward propagating 900-950 nm light measured out of the 980 mm port of the WDM was 45 mW at the max output power. This is an uncalibrated value and may contain significant 1120 nm power. FIG. 10 plots the spectra for selected points shown in FIG. 9 as well as the integrated power vs. wavelength for the 1205 mW (highest power) data point. We see from FIG. 10 that ~20% of the power at the highest measured value was in the 920 nm ASE consistent with the ~25% difference between the 1427 nm and All Power curves in FIG. 9. The 1.1 μm wavelength band is <1% of the total power and thus even though the 980 nm edge filter does not block this light, the contribution of 1.1 μm light to the measured 1427 nm power is negligible. We note that at the very highest power, there appears to be some increased ASE at 1120 nm. This particular piece of fiber was transitioning slightly in diameter during the draw process. The next piece of fiber cut from the spool lased at 1120 nm preferentially. The pitch of the microstructure was changing in this region of the draw and became too small to completely suppress the 1120 nm gain.

It is likely that the fiber we report on here was similar near the input end and that significant excess ASE formed at this end of the fiber. However, this 1120 nm parasitic light was attenuated by the portion of the fiber nearer the pump source, which was correctly filtering the light at these wavelengths. No significant amount of 1120 nm light reached the power meter measuring the 1427 nm signal. This was verified by collecting tight from the spectral reflection off the power meter using a multimode fiber and monitoring the spectra with the optical spectrum analyzer, which showed the 1120 nm ASE was <1% of the 1427 nm signal.

Figure 11:
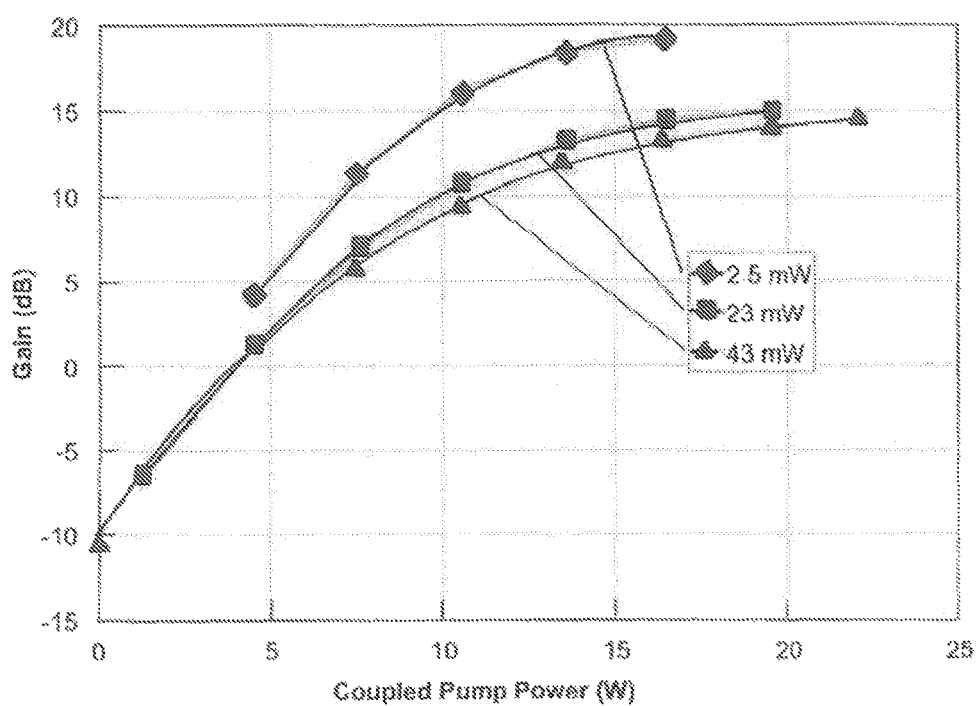
FIG. 11 shows amplifier gain as a function of launched signal power.

FIG. 11 plots amplifier gain as a function of pump power for three different launched signal powers at 1427 nm. The amplifier appears to attain transparency at 4 W of coupled pump power. The 11 dB of fiber loss is observed for the highest launched signal power, but lower launched powers are not plotted below the lower limit of the power meter ~3 mW. We note the gain at 23 mW and 43 mW launched power is not significantly different, this may suggest that 20 mW was sufficient to saturate the amplifier, though this conclusion is somewhat in doubt given the strong parasitic ASE at 930 nm. For 2.5 mW launched signal power, a maximum gain of 19.3 dB is measured. The measured 1120 nm ASE is approximately 10× higher at this point than in the 43 mW launched power case, but still <1% total power when integrated across the spectrum.

For completeness, we also characterized the 30 m, 808 nm pumped amplifier. Note that 11.6 dB of gain was attained for 24 mW of launched signal power (splice loss was worse in this case) or 346 mW of total signal power. The maximum 808 nm coupled pump power was 12 W prior to the onset of parasitic lasing at 920 nm. At 12 W coupled pump power and 346 mW signal power, there was 1236 mW of total power out of the amplifier. That is, $\sim\!\!3\!/\!4^{th}$ of the total power was at 920 nm. This is significantly worse than the 880 nm pump case and further illustrates the need to continuously spectrally filter the 900-950 nm-wavelength band in order to attain good amplifier performance from 1360-1440 nm. Regarding beam quality, at 920 nm the $M^2$ was less than 1.3. Our calculations indicate the mode field diameter at 1427 nm to be 22 μm and the loss of the next higher order mode to be 0.5 dB/m.

Thus, an embodiment of the present invention has been experimentally demonstrated to produce 1.2 W output power at 1427 nm and 19.3 dB of gain at this wavelength in a neodymium filler amplifier with a microstructure waveguide design that creates high spectral attenuation in the region from 1050-1120 nm. To the best of our knowledge, this is 100× higher than the highest average power previously attained from a neodymium fiber amplifier or laser and the attained gain is 9.3 dB higher than any prior measurements. Further, our data clearly shows the potential for significant improvement in the performance of this amplifier. Key areas for future improvement are reduction of OH reducing background loss in the amplifier, expanding the waveguide spectral attenuation to cover all wavelengths from 850-1150 nm, addressing the low absorption from the pump cladding (possibly by core pumping) and seeding the amplifier at a wider range of wavelengths.

Figure 12:
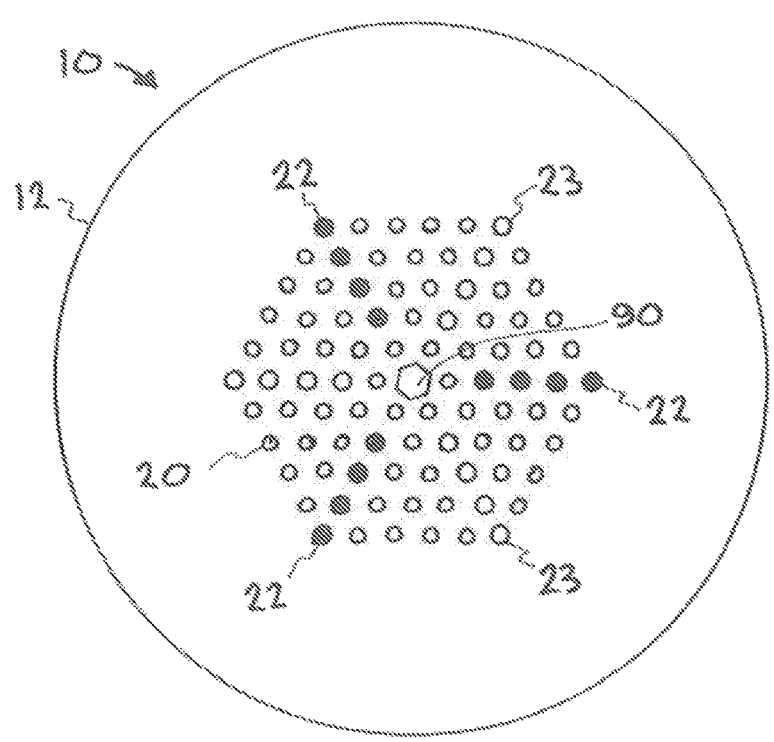
FIG. 12 shows an alternative embodiment of a PCF based with GRINs.

FIG. 12 shows an alternative embodiment of a PCF based with GRINs. The hexagonal structure of the embodiment of FIG. 2 allows for six equivalent resonant coupling waveguides. FIG. 12 shows a structure that is similar to FIG. 2. This embodiment has a 1 cell 90 core and includes two types of GRIN leakers (22 and 23). As in FIG. 2, the overall fiber 10 has a round shape and includes outer glass 12. The PCF waveguide defining elements are arranged upon a hexagonal grid for ease of fabrication as the "stack and draw" PCF fabrication process naturally favors hexagonal packing. The micro-structure may also include an air cladding, not shown in this figure. However, for low-power (<1 W) telecom fiber amplifiers, one skilled in the art will recognize the analog to erbium doped fiber amplifiers and consequently that direct pumping of the core may be desired for a telecom amplifier application, in which case a pump cladding is neither desired nor required. The lattice elements 20 are Fluorine-doped rods to provide a reduced index. In a specific embodiment utilizing this design, the fiber structure is 11 cells across, not counting the possible pump cladding, and the final drawn pitch is 6.6 μm. The core is 1 cell and is index matched to $SiO_2$. PCF Royals (same NA, new fill factor) have a NA of 0.14 (NdeI=−6.743e−3), and an ID/OD ratio of 0.75. The GRIN leakers are of two types and are compatible with reducing standard GRIN OD. GRIN 22 has a NA of 0.30 (NdeI=3.071e−2) and an ID/OD ratio of 0.500. GRIN 23 has a NA of 0.30 (NdeI=3.071e−2) and an ID/OD ratio of 0.535. At 1400 nm, Aeff=88.3 $\mu m^2$ or MFD~10.6 μm.

Figure 13:
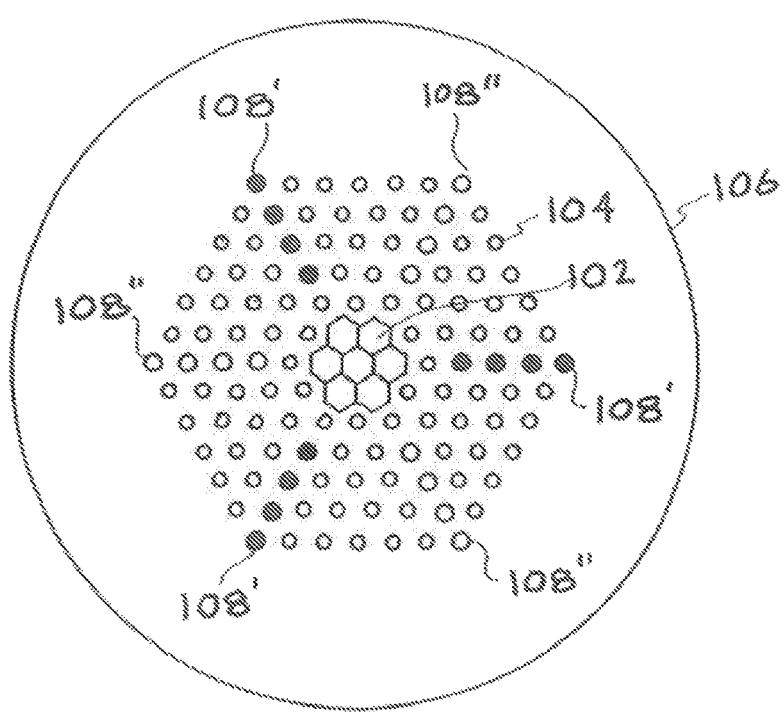
FIG. 13 shows an alternative embodiment of a PCF based with GRINs.

FIG. 13 shows an alternative embodiment of a PCF based with GRINs and includes a core 102, a depressed index region 104 and a drain region 106. As in FIG. 12, the resonant coupling waveguides (GRINs) are not all identical. This design also uses two types (108' and 108") of GRINs with the same index contrast but different aspect ratios (ID/OD), or vice versa, or that differed in both contrast and aspect ratio. The losses of the second group would then be spectrally shifted with respect to the first. The shift could be small, such that the two loss bands overlap and form a wider band in combination. Or the shift could be large, yielding two distinct loss bands and allowing to block two separate spectral lines. This alternative inherits all the features of the embodiment of FIG. 2, and generalizes it to include the possibility of multiple differing resonant coupling waveguides. In a specific embodiment utilizing this design, the fiber structure is 13 cells across, not counting pump cladding and its final drawn pitch is 7.44 μm. The core has 7 cells and is index matched to SiO2. The PCF Royals (our standard) have a NA of 0.14 (NdeI=−6.743e−3) and an ID/OD ratio of 0.533. The two types of GRIN leakers are compatible with reducing the standard GRIN OD. GRIN A has a NA of 0.30 (NdeI=−3.071e−2) and an ID/OD ratio of 0.500. GRIN B has a NA of 0.30 (NdeI=3.071e−2) and an ID/OD ratio of 0.535. At 1550 nm, Aeff=355 $\mu m^2$, or MFD~21.3 μm.

Figure 14:
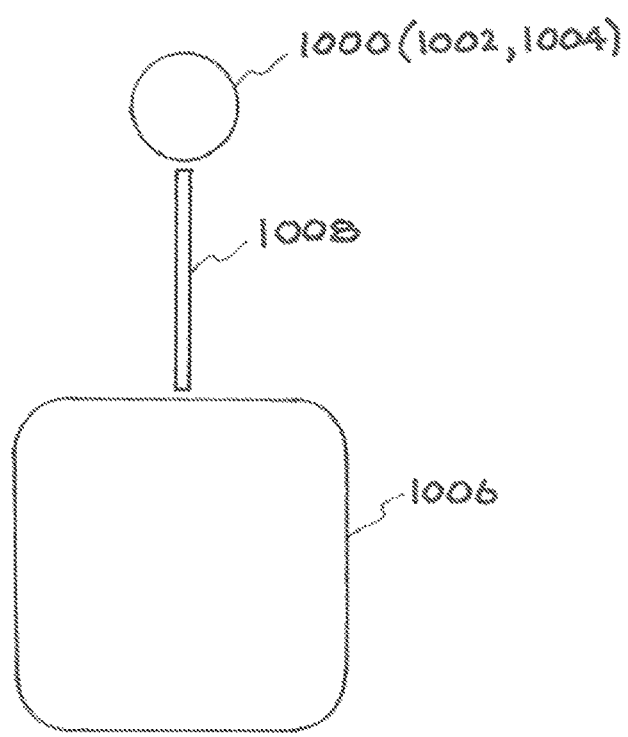
FIG. 14 shows a basic concept of an embodiment of the invention as a set of coupled waveguide elements.

The embodiment of FIG. 2, and similar embodiments, can be most generally described as a set of coupled, waveguide elements, as shown in FIG. 14, Region 1000 is a signal carrying waveguide region, guiding and confining light of the desired wavelength. In practice, region 1000 usually consists of a core 1002 and a depressed index region 1004 as discussed below. Region 1006 is a drain region (also referred to as a sink region), ideally removing any light coupled to it. Region 1008 is an auxiliary waveguide region resonantly coupling regions 1000 and 1006.

Thus, the embodiment of FIG. 2 (and similar ones) relates to optical waveguides in dielectric materials, specifically optical fibers (and amplifiers), which are typically longitudinally invariant. The critical waveguide properties are the modes they support, the coupling between these modes, and their propagation constants (or effective indices, $n_{eff}$). In particular, it provides means to guide (and in some embodiments, to amplify) light of a given wavelength ($\lambda_1$) in the main element 1000 while suppressing the guidance of light of at least one different, specific and undesired wavelength ($\lambda_2$) or wavelengths. This is accomplished by arranging that at $\lambda_2$, region 1000 experiences wavelength selective coupling through the auxiliary waveguide 1008 to the 'sink' region 1006, with the result that light will flow out of 1000 to 1006. Region 1000 and 1006 should be sufficiently isolated that they experience no coupling except through region 1008.

The conditions on the coupling between 1000 and 1008 require that these elements be in close proximity, and that the coupling between them be wavelength selective. The wavelength selective condition can be met if the effective indices ($n_{eff}$) of the relevant modes in the two elements are closely matched at only the undesired wavelength $\lambda_2$. This will be the case if in 1000 the effective index $n_{eff,A}$ has only a weak dependence on wavelength, while in 1006 the effective index $n_{eff,B}$ varies strongly with wavelength (high dispersion); or if the two indices vary strongly and oppositely with wavelength.

The conditions on the coupling between 1008 and 1006 require that these elements also be in close proximity, and that the coupling between them be substantially wavelength agnostic. The wavelength agnostic condition can be met if the region B supports many (ideally a continuum) modes with effective indices higher that of the relevant mode in C.

Finally, the requirement that region 1006 constitute an effective 'sink' or 'drain' for any light entering it can be met by it being substantially dissipative (or absorbing, characterized by absorption coefficient $a_B$). Even if region 1006 is not dissipative, it can still be a sink if it supports many more modes than 1000, such that sharing of light between 1000 and 1006 reduces the light content in 1000. But in this case there will be a further requirement to avoid coupling from 1006 back onto 1000; either the modes in 1006 must experience strong and preferably randomly varying coupling (e.g., by longitudinal variations in its structure), or the distance over which light returns to region 1000 (the 'revival' distance) must be much longer than the fiber in question.

The region 1000 could include a 'step index' core of any shape having any positive index contrast (or Numerical Aperture, NA) with respect to the background glass; a typical step index core is a round one that supports only a single mode, but rectangular (slab) or annular (ring) shapes are also possible. Region 1000 could also be a 'defect' (missing lattice element) in a Photonic Crystal Fiber (PCF) or Photonic Bandgap (PBG) fiber.

Region 1006 could be of any shape, e.g., a shape confined within the fiber cross section; or more commonly, it could be in the shape of a ring surrounding the guiding elements in the core, comprising the fiber cladding and providing mechanical support. It could be made from an absorbing glass to provide dissipation; or it could be any large region (as suggested by the figure) of glass with a high refractive index $n_B$ to provide a multitude of modes.

The auxiliary coupling waveguide region 1008 could be of any size, shape and index $n_C$, provided it supports at least one mode that is resonant ($n_{eff,C}=n_{eff,A}$) with the mode in 1000 at $\lambda_2$ (the undesired wavelength), and has high dispersion. The dispersion requirement can usually be met by employing a spatially small structure of high index. As suggested by the figure, it could be an extended rectangular slab with the same index contrast ($n_B=n_A$) as region A, which would result in multiple modes in 1008, moderately spaced in wavelength. One structure for region 1008 is a string of smaller cores (sub-guides) in place of the slab. This would support 'super-modes' with effective indices clustered about those of a single sub-guide, which are much more widely spaced in wavelength than the modes of the slab; this is a desirable simplification allowing for better spectral control in the resulting fiber. The sub-guides could be any small structure supporting appropriate modes, e.g., step index cores. One sub-guide is a graded index (GRIN) core, because such a guide supports evenly spaced modes; and because they exhibit less scattering losses than step index cores. In some embodiments, such as the $Nd^{3+}$ waveguide operating producing output light within the 1300 nm to 1500 nm range, it may be beneficial to provide loss at more than one range of wavelengths. In such cases, auxiliary waveguide regions of more than one type may be used.

Figure 15:
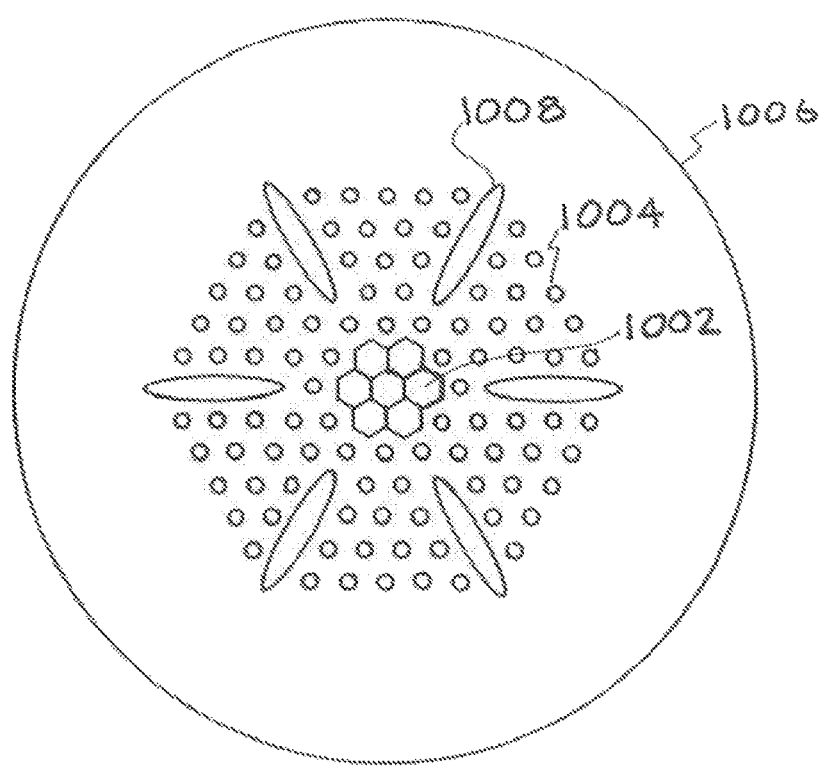
FIG. 15 shows an alternative embodiment which is PCF based with monolithic coupling waveguides.

FIG. 15 shows an alternative embodiment that is PCF based with monolithic coupling waveguides 1008. The resonant coupling waveguides of the first described embodiment were chosen in the form of strings of GRINs. As pointed out there, that form yields advantageous loss bands, and furthermore that arrangement is most compatible with the hexagonal grid used in fabrication.

However, there may be cases where the smaller mode spacing (in wavelength) of a monolithic coupling waveguide is desired. For instance, the mode spacing could be chosen so as to provide two or more separated loss bands for multiple line suppression.

This alternative inherits most of the general features of the preferred embodiment, but with the change that the coupling waveguide 1008 is here monolithic.

Figure 16:
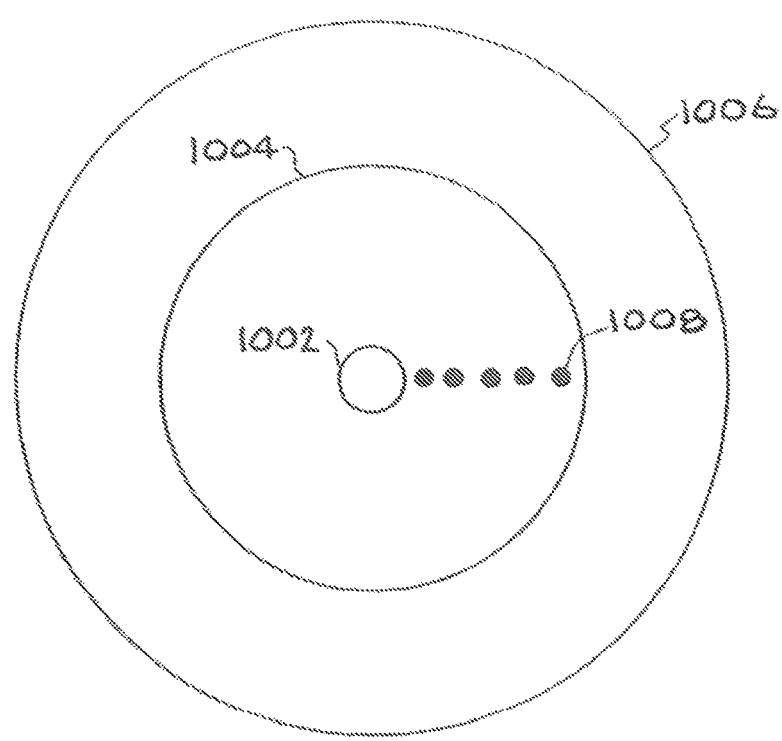
FIG. 16 shows an alternative embodiment having a step index signal core with a raised index sink and where the coupling waveguide is formed as a string of multiple guiding elements.
Figure 17:
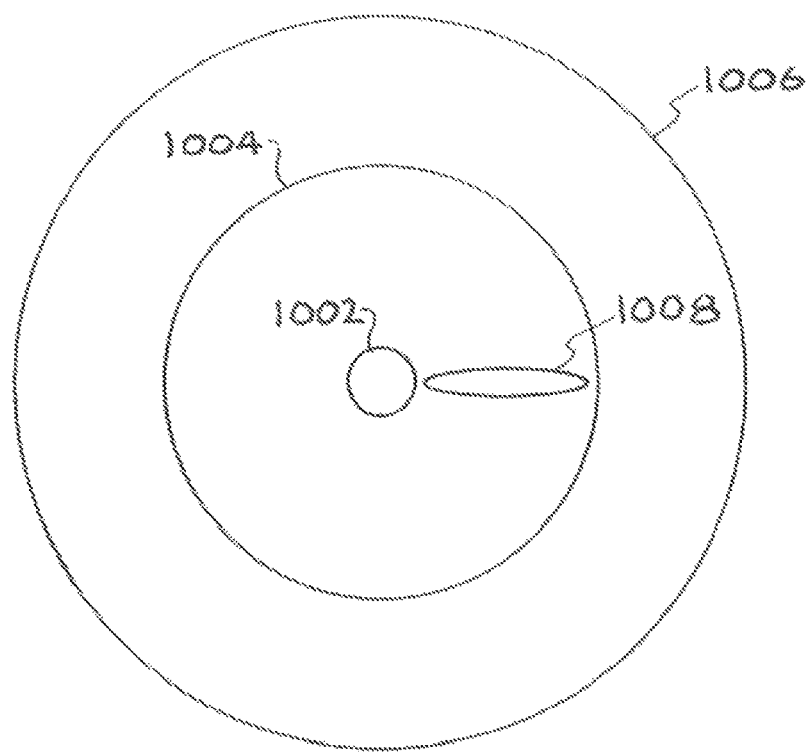
FIG. 17 shows an alternative embodiments having a step index signal core with a raised index sink and where the coupling waveguide is formed as a monolithic guiding element.

FIGS. 16 and 17 show alternative embodiments having a step index signal core with a raised index sink. In the first described embodiment above and the alternative ones above, the core is formed as a defect in the PCF lattice. But all the general rules of thumb can be satisfied also with a step index core and raised index sink, as illustrated by the two embodiments here. Now, the signal core 1002 has an index that is raised with respect to its surroundings 1004, comprising a 'step index' instead of a PCF core. The sink region 1006 also has an index that is higher than that of 1004, and it should also be as high or higher than that of the core 1002, as required by the condition that it constitute a sink. In the figures, the sink 1006 surrounds the core 1002 and coupling waveguides 1008, and forms the outer mechanical element of the fiber. However, it could as well be a structure internal to the outermost mechanical element, as pointed out in the general principal section above. And as above, the coupling waveguides 1008 can be strings of sub-guides as in FIG. 14 or monolithic as in FIG. 15. The embodiments of FIGS. 15-17 can be modified to include more than one type of GRIN. See, e.g., the embodiments of FIGS. 13 and 14. U.S. patent application Ser. No. 15/288,590, titled "Waveguide Design for Line Selection in Fiber Lasers and Amplifiers" filed on the same day as the present application, is incorporated herein by reference.

These embodiments are still compatible with the 'stack-and-draw' fabrication technique, but they are also compatible with the alternative 'rod-in-tube' technique, which may be an advantage in some cases. However, these embodiments will not allow the large mode sizes available with PCF cores. These alternatives illustrate that the invention is not restricted in any way to periodic structures like PCFs and PBG fibers.

One skilled in the art of the design, fabrication and testing of fiber laser amplifiers and oscillators will recognize that the key insight or invention described here that enables the useful amplification or oscillation of light corresponding to the $Nd^{3+}$ $^4F_{3/2}$-$^4I_{13/2}$ atomic transition (nominally 1370-1460 nm region) as per the results described above is any waveguide design that has the general property that the waveguide loss per unit length of fiber is equal to or greater than any gain derived from either of the competing $Nd^{3+}$ transitions; $^4F_{3/2}$ to $^4I_{11/2}$ (1050-1150 nm) or $^4F_{3/2}$ to $^4I_{9/2}$ (900-950 nm) while simultaneously providing the lowest attainable waveguide loss for the desired $Nd^{3+}$ $^4F_{3/2}$-$^4I_{13/2}$ atomic transition (nominally 1370-1460 nm region). It may also be desirable to provide for low waveguide loss for the key pump absorption from $^4I_{9/2}$ to $^4F_{5/2}$ (785-820 nm) to enable core pumping around 808 nm. Further, while it is most desirable to fully suppress the competing gain bands by making the waveguide loss strictly greater than the attainable gain, significant advantage is still possible even if one or both competing atomic transitions is not fully suppressed as shown above in the description of our initial experimental results. We have provided several potential waveguide designs (embodiments) that meet these criteria. However, based on this disclosure, one skilled in the art of optical fiber waveguide design may be motivated to identify additional waveguide designs not described here that meet the essential criteria of desirable low loss from 1370-1460 nm with loss approaching or greater than the $Nd^{3+}$ derived gain in the broad region from 850 nm to 1150 nm corresponding to the primary competing atomic transitions. One candidate distinct from those embodiments documented in detail here is an all-solid photonic band gap design. To develop a specific photonic band gap based embodiment one would need to design a photonic bandgap fiber having good transmission between 1370-1460 nm and low or no transmission at the wavelengths corresponding to the competing gain transitions. In a second alternate example, based on this discourse, one might be motivated to employ a waveguide design wherein co-dopants are added to the fiber core or adjacent cladding to absorb light in the wavelength bands corresponding to the competing atomic transitions without absorbing light at the desired atomic transitions. Note the use of absorbing materials may be difficult to realize as it is difficult to anticipate ion-ion interactions that may occur in the comingled materials, leading to difficult to anticipate secondary effects that may limit performance of the overall system. In summary, based on this disclosure, those skilled in the art might recognize that there are other waveguide designs capable of attaining the desired waveguide loss profile required to realize the desired outcome of significant gain on the $^4F_{3/2}$ to $^4I_{13/2}$ atomic transition with sufficient suppression of competing gain transitions.

Another embodiment utilizes an $Er^{3+}$ doped optical fiber (waveguide) core co-doped with $Yb^{3+}$. This embodiment operates within the wavelength range from 1500 nm to 1620, based upon an $Er^{3+}$ doped optical fiber core co-doped with $Yb^{3+}$ with the properties that with loss less than the attainable gain. The waveguide provides waveguide induced loss greater than the $Yb^{3+}$ generated gain in the wavelength range from 950 nm to 1150 nm and utilizes a pump laser operating at wavelengths shorter than 1100 nm to excite the $Yb^{3+}$ ions into excited state, wherein energy is transferred from the $Yb^{3+}$ ions to the $Er^{3+}$ ions. This embodiment includes a means of coupling the pump laser to the optical fiber (waveguide). When configured as an amplifier, the waveguide further comprises a source configured to provide an input beam to be amplified coupled to the core of the optical fiber, which is then amplified to produce a signal beam with power greater than the input beam. In some cases, it is desirable that the core is co-doped with phosphorous.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
a waveguide having a core doped with a lasing element $Nd^{3+}$, wherein said $Nd^{3+}$ comprises having a first atomic transition and, a second atomic transition and a third atomic transition, wherein said first atomic transition is smaller than said second atomic transition and said third atomic transition, wherein said first atomic transition is the $^4F_{3/2}$ to $^4I_{13/2}$ transition, wherein said second atomic transition is the $^4F_{3/2}$ to $^4I_{11/2}$ transition and wherein said third atomic transition is the $^4F_{3/2}$ to $^4I_{9/2}$ transition, wherein said waveguide is configured to provide more gain than loss at a wavelength of said first atomic transition, more loss than gain at a wavelength of said second atomic transition and more loss than gain at a wavelength of said third atomic transition; and
a source configured to optically pump said core of said waveguide with pump light.

2. The apparatus of claim 1, further comprising a second source configured to provide light to be amplified within said waveguide to produce signal light.

3. The apparatus of claim 1, wherein said wavelength of said first atomic transition is within a range from 1300 nm to 1500 nm, wherein said wavelength of said second atomic transition is within a wavelength range from 1050 nm to 1150 nm and wherein said wavelengths of said third atomic transition is within a range from 870 nm to 950 nm.

4. The apparatus of claim 2, first atomic transition is within a range from 1300 nm to 1500 nm, wherein said wavelength of said second atomic transition is within a wavelength range from 1050 nm to 1150 nm, wherein said wavelength of said third atomic transitions is within a range from 870 nm to 950 nm and wherein said light to be amplified comprises a wavelength that is in the range from 1300 nm to 1500 nm and wherein said pump light is at a wavelength shorter than 950 nm.

5. The apparatus of claim 1, wherein said waveguide comprises fused silica.

6. The apparatus of claim 1, wherein said core comprises fused silica, wherein said core further comprises additional co-dopants selected from the group consisting of phosphorous, germanium, aluminum, fluorine and boron.

7. The apparatus of claim 1, wherein said pump light is directly coupled to said core and wherein the core waveguide loss is less than the effective loss due to the absorption of the pump light by the laser ion.

8. The apparatus of claim 1, wherein said pump light is coupled into said waveguide via a wavelength division multiplexer (WDM) and wherein said signal light is couple to or from said waveguide via said WDM.

9. The apparatus of claim 1, wherein said waveguide comprises a first cladding and a second cladding, wherein said pump light is coupled into said second cladding.

10. The apparatus of claim 9, wherein said pump light is coupled into said second cladding via a pump signal combiner and wherein said signal light is coupled to or from said core via this pump signal combiner.

11. The apparatus of claim 2, further comprising a configuration selected such that (i) said light to be amplified passes through an optical isolator before being coupled to said waveguide and (ii) said signal light passes through an optical isolator.

12. The apparatus of claim 1, wherein said waveguide is configured to reduce, but not eliminate, the gain on at least one of said second atomic transition or said third atomic transition.

13. The apparatus of claim 12, wherein said waveguide is configured to reduce, but not eliminate, the gain on one or more additional atomic transitions.

14. The apparatus of claim 1, wherein said waveguide is configured to provide for waveguide loss that is sufficiently low at the atomic transition from $^4I_{9/2}$ to $^4F_{5/2}$ (785-820 nm) to optically pump said core with pump light having a wavelength within the range from 785 nm to 820 nm.

15. The apparatus of claim 1, wherein said waveguide comprises:
a signal carrying waveguide region, including said core, wherein said signal carrying waveguide region is configured to propagate said wavelength of said first atomic transition, said wavelength of said second atomic transition and said wavelength of said third atomic transition;
a sink region; and
an auxiliary waveguide region configured to resonantly couple said wavelength of said second atomic transition and said wavelength of said third atomic transition from said signal-carrying waveguide region to said sink region.

16. The apparatus of claim 15, wherein said signal carrying waveguide region comprises a lattice having a lower index of refraction relative to said core such that said signal carrying waveguide region confines said wavelength of said first atomic transition.

17. The apparatus of claim 15, wherein said lasing element further comprises one or more additional atomic transitions that are larger than said first atomic transition, wherein said waveguide is configured to provide more loss than gain at one or more wavelengths of said one or more additional atomic transitions, wherein said auxiliary waveguide region is further configured to resonantly couple light at said one or more wavelengths of said one or more additional atomic transitions from said signal-carrying waveguide region to said sink region.

18. The apparatus of claim 16, wherein said auxiliary waveguide region comprises monolithic coupling waveguides.

19. An apparatus, comprising:
a waveguide having a core doped with a lasing element having a first atomic transition and a second atomic transition, wherein said first atomic transition is smaller than said second atomic transition, wherein said waveguide is configured to provide more gain than loss at a wavelength of said first atomic transition and more loss than gain at a wavelength of said second atomic transition; and
a source configured to optically pump the core of said waveguide with pump light, wherein said lasing element comprises $Er^{3+}$ co-doped with $Yb^{3+}$, wherein said wavelength of said first atomic transition in $Er^{3+}$ is within a range from 1500 nm to 1620 nm, wherein said wavelength of said second atomic transition in $Yb^{3+}$ is within a range from 950 nm to 1150 nm, wherein said pump light comprises a wavelength that is shorter than 1100 nm.

20. The apparatus of claim 19, wherein said lasing element is co-doped with phosphorous.

21. An apparatus, comprising:
a waveguide having a core doped with $Nd^{3+}$, wherein said waveguide comprises a configuration that provides more gain than loss at a wavelength of the $^4F_{3/2}$ to $^4I_{13/2}$ transition, more loss than gain at a wavelength of the $^4F_{3/2}$ to $^4I_{11/2}$ transition and more loss than gain at a wavelength of the $^4F_{3/2}$ to $^4I_{9/2}$ transition; and
a source configured to optically pump the core of said waveguide with pump light.

22. The apparatus of claim 21, wherein said configuration is internal to said waveguide.

23. The apparatus of claim 22, wherein said configuration is completely internal to said waveguide and has no elements external to said waveguide to provide more gain than loss at said wavelength of the $^4F_{3/2}$ to $^4I_{13/2}$ transition, more loss than gain at said wavelength of the $^4F_{3/2}$ to $I_{11/2}$ transition and more loss than gain at said wavelength of the $^4F_{3/2}$ to $^4I_{9/2}$ transition.

24. An apparatus, comprising:
a waveguide having a core doped with a lasing element comprising $Er^{3+}$ co-doped with $Yb^{3+}$, wherein said $Er^{3+}$ comprises a first atomic transition including a first range of wavelengths from 1500 nm to 1620 nm, wherein said $Yb^{3+}$ comprises a second atomic transition including a second range of wavelengths from 950 nm to 1150 nm, wherein said first atomic transition is smaller than said second atomic transition, wherein said waveguide comprises a configuration that provides more gain than loss at a wavelength within said first range and more loss than gain at a wavelength within said second range; and
a source configured to optically pump the core of said waveguide with pump light, wherein said pump light comprises a wavelength that is shorter than 1100 nm.

25. The apparatus of claim 24, wherein said configuration is internal to said waveguide.

26. The apparatus of claim 25, wherein said configuration is completely internal to said waveguide and has no elements external to said waveguide to provide more gain than loss at a wavelength within the first range and more loss than gain at a wavelength within the second range.

27. The waveguide of claim 15, wherein said signal carrying waveguide region comprises a step index and wherein said sink region comprises a raised index.

* * * * *